United States Patent [19]

Kalafus et al.

[11] 3,857,730
[45] Dec. 31, 1974

[54] BONDING POLYESTERS TO RUBBER

[75] Inventors: Edward F. Kalafus, Akron; Richard M. Wise, Uniontown, both of Ohio

[73] Assignee: The General Tire & Rubber Company, Akron, Ohio

[22] Filed: June 11, 1973

[21] Appl. No.: 368,558

[52] U.S. Cl. ................... 117/76 T, 117/72, 117/80, 117/138.8 F, 156/110 A, 156/335
[51] Int. Cl. .......................... C09j 3/12, B32b 27/36
[58] Field of Search.................... 117/76 T, 138.8 F; 156/335, 331; 260/29.2 N

[56] References Cited
UNITED STATES PATENTS

| | | | |
|---|---|---|---|
| 3,597,379 | 8/1971 | Van Valkenburg | 156/335 X |
| 3,660,202 | 5/1972 | Edington et al. | 156/335 |
| 3,748,291 | 7/1973 | Bhakuni et al. | 156/331 X |

*Primary Examiner*—Ralph Husack

[57] ABSTRACT

Rubber compounds are readily bonded to polyester reinforcing elements, particularly tire cords of polyester fibers, using a one-step dip process in which the dip consists essentially of an alkaline aqueous emulsion of a minor amount by weight of a mixture of a major amount by weight of a rubbery vinyl pyridine copolymer and a minor amount by weight of a heat reactable 2,6-bis(2,4-dihydroxy phenylmethyl)-4-chlorophenol composition, wherein said emulsion is essentially free of alkali metal materials and wherein the emulsifier used in the emulsion is an ammonium salt or soap. High aged H-adhesions are obtained with this process.

10 Claims, No Drawings

BONDING POLYESTERS TO RUBBER

OBJECTS

An object of this invention is to provide composite articles containing polyester reinforcing elements, e.g., such as those used in the carcass plies of tires, having a minor amount of a one-dip adhesive so that the adhesive containing elements may subsequently be bonded to rubber on curing and being characterized by exhibiting high cord aged H-adhesions. A further object is to provide a method for bonding polyester fibers, cords and so forth to rubber compounds using a single-step dipping process. These and other objects and advantages of the present invention will become more apparent to those skilled in the art from the following detailed description and working examples.

SUMMARY OF THE INVENTION

According to the present invention it has been discovered that polyester reinforcing elements can readily be bonded or adhered to curable rubbery compounds by dipping the elements in a dip consisting essentially of an aqueous alkaline emulsion of a minor amount by weight of a mixture of a major amount by weight of a rubbery vinyl pyridine copolymer and a minor amount by weight of a heat reactable 2,6-bis(2,4-dihydroxyphenylmethyl)-4-chlorophenol composition, drying the same, and combining said dipped and dried element with a vulcanizable rubber compound and vulcanizing the same, wherein said emulsion is essentially free of alkali metal materials and wherein the emulsifier used in the emulsion is an ammonium salt or soap.

Polyester reinforcing elements treated in this fashion exhibit high aged H-adhesion values.

On the other hand the usual latices used in tire cord dips are made with emulsifying agents which are sodium or potassium salts of various organic acids. These alkali metal salts are deposited on the tire cord during dipping and are not removed by the heat treatment of the cord or by any other of the subsequent steps carried out on the cord or fabric during the tire manufacturing process. The presence of an alkali salt does not appear to be detrimental to cords such as nylon or rayon, but the ester linkages of polyester tire cord could be expected to undergo degradation in an alkaline environment especially at higher temperatures. The adhesion of polyester cord to rubber as well as the cord tensile strength decreases with increasing temperature of a running tire, and at least part of this degradation may be due to the alkali salts on the cord.

Thus it has been found that if the sodium or potassium salt type emulsifier (so-called "fixed base" type) used during polymerization is replaced by a "fugitive base" type such as an ammonium salt which is decomposed and the ammonia removed during the cord processing by drying or heating, increased adhesions are obtained on polyester cords, especially after in-rubber heat aging and steam aging.

It is seen that this invention provides means for reducing not only the basicity but also the hygroscopicity of the adhesive coating on the polyester cord.

Being essentially free of alkali metal materials is intended to mean that the adhesive emulsion dip or adhesive is essentially free of alkali metal, alkali metal ions, alkali metal salts or other alkali metal compounds from the water used during polymerization of the rubbery copolymer, preparation of resin, polymerization catalyst and so forth although it is recognized that absolute freedom from alkali metal may not be possible since such may be present in very small amounts from the water, dissolved from the surface of containers and so forth.

DISCUSSION OF DETAILS AND PREFERRED EMBODIMENTS

The polyester reinforcing elements of the present invention comprise fibers, continuous filaments, staple, tow, yarns, cords, fabric and the like, particularly cords for use in building the carcasses of tires such as truck tires, and are linear high molecular weight polyesters usually made by the condensation of $\alpha,w$-glycols and dicarboxylic acids. These polyester fibers and the like may be oriented and can have number average molecular weights up to about 60,000 and melting points of up to about 300°C. Preferably, these polyesters exhibit substantial crystallinity, up to as much as about 50 percent, usually 38–45 percent, high strength and high tenacity. Also, preferred, are the polyesters in which the fiber is composed of at least 80 percent by weight of an ester of a dihydric alcohol and terephthalic acid such as poly(ethylene terephthalate). Examples of such polyesters are the high molecular weight polymers obtained from polyethylene glycols and the aromatic dicarboxylic acids, e.g., the high molecular weight condensation product obtained from ethylene glycol and terephthalic acid known as polyethylene terephthate. Other polyesters which may be used are poly(ethylene oxybenzoate); polypivalalactone; terpolymers from dimethyl phthalate, dimethyl isophthalate and ethylene glycol; polyesters having at least two different repeating units from ethylene terephthalate, p-trimethylene oxybenzoate, and ethylene-1,4-diphenoxy butane-4,4'-dicarboxylate; poly(ethylene terephthalate-isophthalate); poly(1,4-cyclohexylenedimethylene terephthalate); and the like and mixtures thereof. Suitable polyester reinforcing elements are commercially available under the trademarks "Dacron" (du Pont), "Encron" (American Enka Corporation and "Vycron" (Beaunit Corporation). These high molecular weight linear polyesters are well known and can be made by methods known to the art. For example, the preparation of polyesters is shown by U.S. Pat. Nos. 2,465,319; 2,965,613 and 2,901,466. A detailed discussion of polyesters such as polyester cords and fabrics used in the manufacture of tires and other adhesive dips for the same is shown by "Mechanics of Pneumatic Tires," Clark, National Bureau of Standards Monograph 122, U.S. Department of Commerce, issued November, 1971, pages 238 to 241 and 279 to 290. Other references disclosing the preparation of polyesters useful for making filaments, fibers, cords and so forth and which can be used to make various products are:

A. "Encyclopedia of Polymer Science And Technology," Volume 11, 1969, Interscience Publishers a division of John Wiley & Sons, Inc., New York, pages 1–41;

B. "Encyclopedia of Chemical Technology," Kirk-Othmer, Second Edition, Volume 16, 1968, Interscience Publishers a division of John Wiley & Sons, Inc., New York, pages 143 to 159; and C. "Polyesters," Korshak et al, 1965, Pergamon Press Inc., New York, N.Y., pages 384 to 415.

The type of rubber emulsion or latex used in the tire cord dip bath of this invention is a latex of a copolymer of a vinyl pyridine and a conjugated diolefin having 4 to 6 carbon atoms. The rubber latex comprises an aqueous emulsion or dispersion of a copolymer of 50 to 95 percent by weight of a conjugated diolefin having 4 to 6 carbon atoms, 5 to 40 percent of a vinyl pyridine and 0 to 40 percent of a styrene. Examples of suitable vinyl pyridines are 2-vinyl pyridine, 4-vinyl pyridine, 2-methyl-5-vinyl pyridine, and 5-ethyl-2-vinyl pyridine.

In practicing the present invention, it is usually preferred to use an emulsion or latex of a copolymer of from about 60 to 80 percent by weight of butadiene-1,3,7 to 32 percent styrene and 7 to 22 percent of 2-vinyl pyridine. Excellent results are obtained using a latex of a terpolymer of about 70 percent by weight of butadiene-1,3, 15 percent styrene and 15 percent 2-vinyl pyridine having a total solids content of around 30 to 50 percent by weight. Also, blends of latices may be used such as a blend of a butadiene-1,3/2-vinyl pyridine rubbery copolymer latex and a butadiene-1,3/styrene rubbery copolymer latex or a blend of a butadiene-1,3/styrene/2-vinyl pyridine rubbery copolymer latex and a butadiene-1,3styrene rubbery copolymer latex so long as the percent by weight ratio of total monomers in the copolymers is within the ranges as specified above. The pH of the latices should be similar and the surfactants and stabilizers should be compatible to avoid coagulation on blending or mixing of the latices. Moreover, the polmerization ingredients used in making the butadiene/styrene copolymer latices should be the same or similar to those used in the polymerization of the vinyl pyridine copolymer to avoid the introduction of alkali metal salts or ions and so forth and as discussed below.

The rubbery vinyl pyridine copolymer is made by anionic free-radical aqueous emulsion polmerization. The water used in the polymerization should be deionized. The emulsifiers employed in polymerization are water soluble ammonium salts such as the ammonium phosphates and sulfates of aliphatic alcohols preferably of long chain aliphatic alcohols or ammonium soaps of carboxylic acids, preferably, of aliphatic monocarboxylic acids. Examples of such emulsifiers are ammonium palmitate, ammonium stearate, ammonium myristate, ammonium oleate, ammonium linoleate, ammonium laurate, ammonium caproate, ammonium ricinoleate, ammonium rosinates, ammonium lauryl phosphate, ammonium cetyl phosphate, ammonium capryl phosphate, ammonium lauryl sulfate, ammonium cetyl sulfate, ammonium capryl sulfate, and the like and mixtures thereof. The emulsifiers can be added as such to the polymerization reactor or may be formed "in-situ" in the reactor by adding the free acid and ammonium hydroxide and so forth. While potassium or sodium persulfate may be used as a catalyst since it forms only weakly basic salts and since the alkali metal ion produced is far less than that which would be provided from an alkali metal soap, it is preferred to use catalysts free of alkali metal such as ammonium persulfate, $\alpha,\alpha'$-azodiisobutyronitrile (VAZO, du Pont), and the peroxides such as dibenzoyl peroxide, diisopropyl peroxydicarbonate, cumene hydroperoxide, t-butyl hydroperoxide, t-butyl perbenzoate, di-t-butyl peroxide and the like. Mixtures of catalysts may be used. Chain transfer agents or modifiers, such as mercaptans, for example, tertiary dodecyl mercaptans as well as other mercaptans, are used during polymerization to reduce gel formation. Electrolytes like ammonium carbonate are employed to reduce the viscosity of the latex, and pre-floc preventatives are added like condensed naphthalene sulfonic acid to prevent pre-floc. Polymerizations should be conducted in closed reactors under an inert atmosphere with stirring at temperatures of from about 40° to 100°C. for from about 12 to 24 hours to obtain conversions of from about 85 to 100 percent. The amounts of polymerization ingredients and the polymerization conditions to use are well known to the art. See "Vinyl and Related Polymers," Schildknecht, John Wiley & Sons, Inc., New York, 1952; "Synthetic Rubber," Whitby, Davis and Dunbrook, John Wiley & Sons, Inc., New York, 1954; and "Emulsion Polymerization," Bovey, Kolthoff, Medalia and Meehan, Interscience Publishers, Inc., New York, 1955. Emulsions or latices of rubbery vinyl pyridine copolymers for use in cord dips are shown by U.S. Pat. Nos. 2,561,215; 2,615,826 and 3,437,122.

The heat reactable 2,6-bis(2,4-dihydroxy phenyl methyl)-4-chlorophenol composition used in the dip of the present invention is made by the process of first reacting about 2 mols of formaldehyde with 1 mol of parachlorophenol in water containing sodium hydroxide. The precipitated sodium salt is filtered off, washed, dissolved in hot water acidified with acetic acid, cooled, filtered and washed until free of acid. The resulting intermediate product can then be recrystallized from alcohol to obtain the 2,6-bis hydroxy methyl -4-chlorophenol which then is reacted with about 2 mols of resorcinol to give the heat reactable bis (dihydroxy phenyl methyl(chlorophenol composition. The final product may be treated to remove unused starting materials and by-products. However, it or the intermediate product should be washed or treated as much as practical to remove all or essentially all of the alkali metal ions or salts. The product as produced is substantially heat reactable 2,6-bis(2,4-dihydroxy phenyl methyl)-4-chlorophenol composition having an average molecular weight of up to about 800 and a melting point of up to about 240°C. It is added to or mixed with the latex of the rubbery vinyl pyridine copolymer in the form of a solution 5 to 30 percent solids in water containing $NH_3$ sufficient to render the solution alkaline, usually about 0.5 to 7.5 percent. More information on how to prepare the heat reactable 2,6-bis(2,4-dihydroxy phenyl methyl)-4-chlorophenol composition is shown by Mather, "Development of a Polyester-Rubber Adhesive," British Polymer Journal, Volume 3, March, 1971, pages 58 to 62 and U.S. Pat. No. 3,660,202. The chlorophenolic composition is heat reactable so that it can react with itself, the rubber and possibly also the cord.

Water is used in an amount sufficient to provide for the desired dispersion of the rubber or latex particles, for the solution of the heat reactable chlorophenolic composition and for the proper solids content to get the necessary pick-up of solids on and penetration between the fibers of the polyester cord.

The dip thus consists essentially of an aqueous emulsion of the rubbery vinyl pyride copolymer latex and the heat reactable chlorophenolic composition, the copolymer and chlorophenolic composition being present in a total amount (as dry solids, dispersed or dissolved in the water) of from about 10 to 30 percent by weight. The ratio (dry) of the copolymer to the chlorophenolic composition in the emulsion dip is from about 100:10 to 100:75 parts by weight, preferably from about 100:20 to 100:55 parts by weight. sufficient NH₄OH is added as necessary to make the emulsion alkaline, to prevent premature coagulation of the rubbery copolymer and to keep the chlorophenolic compound in solution in the emulsion.

In order to provide data for the tire cord adhesive of this invention, a standard single-cord H-pull test is employed to determine the static adhesion at room temperature and above of the adhesive-coated tire cord to rubber. All the data submitted herein including the examples which follow are based upon identical test conditions, and all test specimens are prepared and tested in the same way generally in accordance with ASTM Designation: D 2138-67.

In order to apply the adhesive dip to the polyester cords in a reliable manner, the cords are fed through the adhesive dip bath containing the rubber and the chlorophenol and into a drying oven where they are dried. Also, as the cords leave the oven they enter a cooling zone where they are air cooled. In each case the adhesive-coated cords leaving the dip are dried in the oven at from about 300° to 500°F., or at a temperature below the temperature at which the polyester of the cord would lose its tensile strength, for from about 30–150 seconds. The time the cord remains in the dip is about a second or so or at least for a period of time sufficient to allow wetting of the cord and penetration of the fibers of the cord by the adhesive mixture.

The single-cord H-pull test is then employed to determine the static adhesion of the dried adhesive coated polyester fiber cords to rubber. In each case the rubber test specimens are made from the same standard type rubber composition using the following recipe:

| Material | Parts by Weight |
| --- | --- |
| Natural rubber (No. 3 Smoked Sheet) | 36.50 |
| Butadiene-styrene rubbery copolymer, average 23.5% bound styrene, emulsion polymerized | 43.50 |
| Polybutadiene (solution polymerized BD, about 93% cis-1,4, Raw Mooney ML-4 at 212°F. about 40-50) | 20.0 |
| Carbon black, high abrasion furnace (high structure) | 35.0 |
| Carbon black, fast extrusion furnace | 35.0 |
| Alkyl aromatic polyindene resin, reinforcing and processing aid, Picco 100, pennsylvania Industrial Chemical Corporation | 4.5 |
| Naphthenic oil, Circosol Type 2XH, Sun Oil Co. | 32.80 |
| Zinc oxide | 3.8 |
| Stearic acid | 1.5 |
| Mixture of mono, di and tristyrenated phenols, Age Rite Spar, R. T. Vanderbilt Co., Inc., antioxidant | 1.2 |
| Benzothiazyl disulfide, Altax, R. T. Vanderbilt Co., Inc., accelerator | 1.2 |
| Tetramethyl thiuram monosulfide, active ingredient, Thionex, accelerator, E. I. du Pont de Nemours & Co., Inc. | 0.1 |
| Crystex, about 80% insoluble sulfur and 20% petroleum oil, Stauffer Chemical Co. | 3.0 |

In every case the polyester cords to be tested are placed in parallel positions in a multiple-strand mold of the type described in the single-cord H-pull adhesion test designated ASTM D 2138-67, the mold is filled with unvulcanized rubber of the above composition, the cords being maintained under a tension of 50 grams each, and the rubber is cured 20 minutes at around 305°F. to the elastic state. Each rubber test specimen is ¼ inch thick and has a ⅜ inch cord embedment.

After the rubber has been cured, the hot reticulate cured rubber piece is removed from the mold, cooled, and H-test specimens are cut from said piece, each specimen consisting of a single polyester cord encased in rubber and having each end embedded in the center of a rubber tab or embedment having a length of around 1 inch or so. The specimens are then aged at least 16 hours at room temperature. The force required to separate the cord from the rubber is then determined at room temperature or 250°F. using an INSTRON tester provided with specimen grips. The maximum force in pounds required to separate the cord from the rubber is the H-adhesion value.

While the adhesive containing polyester reinforcing elements of this invention can be adhered to a vulcanizable blend of natural rubber, polybutadiene rubber, and rubbery butadiene-styrene copolymer by curing the same in combination together, it is apparent that said adhesive containing polyester reinforcing element can be adhered to other vulcanizable rubbery materials, by curing or vulcanizing the same in combination with the rubber, such as one or more of the foregoing rubbers as well as nitrile rubbers, chloroprene rubbers, polyisoprenes, vinyl pyridine rubbers, acrylic rubbers, isoprene-acrylonitrile rubbers and the like and mixtures of the same. These rubbers prior to curing can be mixed with the usual compounding ingredients including sulfur, stearic acid, zinc oxide, magnesium oxide, accelerators, antioxidants, antiozonants and other curatives and the like well known to those skilled in the art for the particular rubbers being employed.

Polyester fibers, yarns, filaments, cords or fabric and the like coated with the adhesive of the present invention can have from about 3 to 7 percent by weight (dry) total solids from the adhesive dip on the cord based on the weight of the cord and can be used in the manufacture of radial, bias, or belted-bias passenger tires, truck tires, including the carcasses, belts, flippers and chafers thereof, motorcycle and bicycle tires, off-the-road tires, airplane tires, transmission belts, V-belts, conveyor belts, hose, gaskets, rubbers, tarpaulins and the like.

The following examples will serve to illustrate the invention with more particularity to those skilled in the art. In these examples the parts are parts by weight unless otherwise indicated.

EXAMPLE I

Polyester cords (du Pont "Dacron," type 1300/3) were dipped in the aqueous emulsions shown below and dried (heat treated) at 440°F./90 seconds with 0 percent applied stretch. After cooling, the cords were embedded in the standard rubber stock and molded, and the resulting assembly was cured for 20 minutes at 305°F. After curing, the assembly was removed from the mold and cooled, and the cords were tested according to the standard H-adhesion test. The compositions of the cord dips and the test results are shown below.

TABLE I

H-Adhesion, Pounds Pull (⅜" rubber embedment)
At Room Temperature (about 25°C.)

| Dip | Unaged | Heat[1] Aged | Steam[2] Aged |
|---|---|---|---|
| A | 56 | 37 | 43 |
| B | 53 | 44 | 49 |

Dip A - Emulsion of:
a. 67.5 parts by weight of a latex of a rubbery terpolymer of 70 percent by weight butadiene-1,3, 15 percent by weight of styrene, and 15 percent by weight of 2-vinyl pyridine (41 percent by weight solids); monomers were copolymerized in deionized water containing potassium persulfate, potassium salt of rosin acid as emulsifier, a condensed naphthalene sulfonic acid and MTM (mixed tertiary mercaptans);
b. 67.5 parts of water; and
c. 65.0 parts of an aqueous solution containing about 5.5 percent by weight of ammonia and 20 percent by weight of 2,6-bis-(2,4-dihydroxy phenylmethyl)-4-chlorophenol (e.g., the reaction product of of HCHO, p-chlorophenol and resorcinol).

Dip B - Emulsion of:
a. 67.5 parts by weight of a latex of a rubbery terpolymer of 70 percent by weight of butadiene-1,3, 15 percent by weight of styrene and 15 percent by weight of 2-vinyl pyridine (41 percent solids); the monomers were copolymerized in deionized water containing $\alpha,\alpha'$-azodiisobutyronitrile, tertiary dodecyl mercaptan, ammonium salt of lauric acid as the emulsifier and formed in situ in the reactor on the addition of $NH_4OH$ and lauric acid, ammonium carbonate, and condensed naphthalene sulfonic acid;
b. 67.5 parts of water; and
c. 65.0 parts of the same type of aqueous alkaline chlorophenolic solution as shown for Dip A, above.

[1] Sample was heated in a closed container at 300°F. for 24 hours under nitrogen before conducting H-adhesion test.

[2] Sample was heated in a closed container with water present at 250°F. for 4 hours under nitrogen before conducting H-adhesion test.

The above tests show the higher in-rubber aged H-adhesions observed for polyester cord using a no-fixed or fugitive base latex of this invention.

EXAMPLE II

Polyester cords (du Pont "Dacron," type 1300/3) were dipped in the aqueous emulsions shown below and dried (heat treated) at 440°F./90 seconds with 0 percent applied stretch. After cooling, the cords were embedded in the standard rubber stock and molded, and the resulting assembly was cured for 20 minutes at 305°F. After curing, the assembly was removed from the mold and cooled, and the cords were tested according to the standard H-adhesion test. The compositions of the cord dips and the test results are shown below.

TABLE II

H-Adhesion, Pounds Pull (⅜" rubber embedment)
at Room Temperature (about 25°C.)

| Dip | Unaged | Heat[1] Aged | Steam[2] Aged |
|---|---|---|---|
| C | 58 | 36 | 46 |
| D | 57 | 49 | 56 |

Notes:
Dip C - Emulsion of:
a. Same as a. of Dip A in Example I, above;
b. 67.5 parts of water; and
c. 65.0 parts of an aqueous solution containing about 2.3 percent by weight of ammonia and 8.9 percent by weight of 2,6-bis-(2,4-dihydroxyphenyl methyl)-4-chlorophenol.

Dip D - Emulsion of:
a. Same as a. of Dip B in Example I, above;
b. 67.5 parts of water; and
c. Same as c. in Dip C, above.

[1] Sample was heated in a closed container at 300°F. for 24 hours under nitrogen before conducting H-adhesion test.

[2] Sample was heated in a closed container with water present at 250°F. for 4 hours under nitrogen before conducting H-adhesion test.

The above tests show the substantially higher in-rubber aged H-adhesions observed for polyester cord using a no-fixed or fugitive base latex of this invention.

EXAMPLE III

Polyester cords (du Pont "Dacron," type 1300/3) were dipped in the aqueous emulsion dips shown below and dried (heat treated) at 440°F./90 seconds with 0 percent applied stretch. After cooling, the cards were embedded in the standard rubber stock and molded, and the resulting assembly was cured for 20 minutes at 305°F. After curing, the assembly was removed from the mold and cooled, and the cords were tested according to the standard H-adhesion test. The compositions of the cord dips and the test results are shown below.

TABLE III

H-Adhesion, Pounds Pull (⅜" rubber embedment)
at Room Temperature (about 25°C.)

| Dip | Unaged | Heat[1] Aged | Steam[2] Aged |
|---|---|---|---|
| E | 49 | 42 | 43 |
| F | 47 | 44 | 46 |

Notes:
Dip E - Emulsion of:
a. 67.5 parts by weight of a latex of the same type of rubbery terpolymer as in Dip A, above, except that the emulsifier used was sodium lauryl sulfate in place of the potassium rosinate and the catalyst was $\alpha,\alpha'$-azodiisobutyronitrile in place of potassium persulfate;
b. 67.5 parts of water; and
c. 65.0 parts of the same type of aqueous alkaline chlorophenolic solution as shown for Dip A, above.

Dip F - Emulsion of:
a. 67.5 parts by weight of a latex of the same type of rubbery terpolymer as in Dip B except the emulsifier was ammonium lauryl sulfate prepared before adding to the reactor instead of ammonium laurate prepared in situ;

b. 67.5 parts of water; and c. 65.0 parts of the same type of aqueous alkaline chlorophenolic solution as shown for Dip A, above.

[1] Sample was heated in a closed container at 300°F. for 24 hours under nitrogen before conducting H-adhesion test.

[2] Sample was heated in a closed container with water present at 250°F. for 4 hours under nitrogen before conducting H-adhesion test.

The above tests show slightly higher in-rubber aged H-adhesions for the polyester cord in which a no-fixed or fugitive base latex of this invention was used.

The embodiments of the invention in which an exclusive property or privilege is claimed are defined as follows:

1. A method for adhering a polyester reinforcing element to a rubber compound which comprises dipping said element in a dip consisting essentially of an aqueous alkaline emulsion consisting essentially of a minor amount by weight of a mixture of a major amount by weight of a rubbery vinyl pyridine copolymer and a minor amount by weight of a heat reactable 2,6-bis(2,4-dihydroxy phenylmethyl)-4-chlorophenol composition, drying the dipped element, and combining said dipped and dried element with a vulcanizable rubber compound and vulcanizing the resultant product, said emulsion being essentially free of alkali metal materials and the emulsifier used in said emulsion being water soluble and being selected from the group consisting of an ammonium sulfate of an aliphatic alcohol, an ammonium phosphate of an aliphatic alcohol, and an ammonium soap of a carboxylic acid and mixtures thereof.

2. A method for adhering a polyester reinforcing element to a rubber compound which comprises treating said element with an adhesive composition consisting essentially of an aqueous alkaline emulsion of from about 10 to 30 percent by weight as dry solids of a mixture of a rubbery vinyl pyridine copolymer and a substantially heat reactable 2,6-bis(2,4-dihydroxy phenylmethyl)-4-chlorophenol composition, the parts by weight ratio dry of said copolymer to said chlorophenolic composition being from about 100:10 to 100:75, heat treating said element to remove the water and to heat-set the solids from said adhesive composition and to deposit on said element from said adhesive composition a total of from about 3 to 7 percent by weight solids, cooling said treated element, combining said cooled treated element with an unvulcanized vulcanizable rubber compound, and vulcanizing the resultant product, said heat treatment being conducted at temperatures of from about 300° to 500°F. for from about 30 to 150 seconds, said emulsion being essentially free of alkali metal materials, and the emulsifier used in said emulsion being water soluble and being selected from the group consisting of an ammonium sulfate of an aliphatic alcohol, an ammonium phosphate of an aliphatic alcohol, and an ammonium soap of a carboxylic acid and mixtures thereof.

3. A method according to claim 2, where said rubbery vinyl pyridine copolymer is a copolymer of from about 60 to 80% by weight of butadiene-1,3, from 7 to 32 percent by weight of styrene, and from 7 to 22 percent by weight of 2-vinyl pyridine, and where said chlorophenolic composition has an average molecular weight of up to about 800 and a melting point of up to about 240°C.

4. A method according to claim 3 in which said emulsifier is the ammonium sulfate of a long chain aliphatic alcohol.

5. A method according to claim 3 in which said emulsifier is the ammonium phosphate of a long chain aliphatic alcohol.

6. A method according to claim 3 in which said emulsifier is an ammonium soap of an aliphatic monocarboxylic acid.

7. A method according to claim 3 where said reinforcing element is a cord of linear long chain synthetic substantially crystalline poly(ethylene terephthalate).

8. A polyester reinforcing element useful in reinforcing rubber and containing from about 3 to 7 percent by weight of said element of an adhesive useful for bonding said element to a vulcanizable rubber on vulcanization of said rubber, said adhesive consisting essentially of a major amount by weight of a rubbery vinyl pyridine copolymer and a minor amount by weight of a heat reacted 2,6-bis(2,4-dihydroxy phenylmethyl)-4-chlorophenol composition, said adhesive being essentially free of alkali metal materials and of ammonia or ammonium ions.

9. A polyester reinforcing element according to claim 8 in which said element is a cord of a linear long chain synthetic substantially crystalline poly(ethylene terephthalate).

10. A bonded composite material comprising a polyester element embedded in a vulcanized rubber, said element containing a total of from about 3 to 7 percent by weight dry based on the weight of said element of an adhesive composition consisting essentially of a deposit of a heat set mixture of a major amount by weight of a rubbery vinyl pyridine copolymer and a minor amount by weight of a heat reactable 2,6-bis(2,4-dihydroxy phenylmethyl)-4-chlorophenol composition, said adhesive composition forming a bond between said element and said rubber, and said adhesive further being essentially free of alkali metal materials and of ammonia or ammonium ions.

* * * * *

PO-1050
(5/69)

UNITED STATES PATENT OFFICE
CERTIFICATE OF CORRECTION

Patent No. 3,857,730          Dated December 31, 1974

Inventor(s) Edward F. Kalafus and Richard M. Wise

It is certified that error appears in the above-identified patent and that said Letters Patent are hereby corrected as shown below:

Column 3, line 22, which reads: "1,3styrene" should read ---1,3/styrene---.

Column 3, line 28, which reads: "polmerization" should read ---polymerization---.

Column 4, line 32, which reads: "methyl(" should read ---methyl)---.

Column 4, line 61, which reads: "pyride" should read ---pyridine---.

Column 5, line 1, which reads: "weight.sufficient" should read ---weight. Sufficient---.

Signed and sealed this 1st day of April 1975.

(SEAL)
Attest:

RUTH C. MASON
Attesting Officer

C. MARSHALL DANN
Commissioner of Patents
and Trademarks